US006993319B2

(12) United States Patent
Himmel et al.

(10) Patent No.: US 6,993,319 B2
(45) Date of Patent: Jan. 31, 2006

(54) PROXIMITY-BASED MOBILE TELEPHONE BILLING INTERVENTION

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 09/942,797

(22) Filed: Aug. 30, 2001

(65) Prior Publication Data

US 2003/0045269 A1 Mar. 6, 2003

(51) Int. Cl.
*H04M 11/00* (2006.01)
*H04Q 7/20* (2006.01)

(52) U.S. Cl. ................. 455/406; 455/456.1; 455/456.6

(58) Field of Classification Search ................ 455/405, 455/406, 433, 421, 422.1, 408, 414.2, 456.1, 455/456.2, 456.3, 456.6, 457
See application file for complete search history.

(56) References Cited

U.S. PATENT DOCUMENTS

| | | | | |
|---|---|---|---|---|
| 6,181,927 | B1 * | 1/2001 | Welling et al. | 455/414.1 |
| 6,253,074 | B1 * | 6/2001 | Carlsson et al. | 455/414.2 |
| 6,546,238 | B1 * | 4/2003 | Nightingale et al. | 455/406 |
| 2002/0176377 | A1 * | 11/2002 | Hamilton | 370/328 |
| 2003/0027555 | A1 * | 2/2003 | Malackowski et al. | 455/414 |
| 2004/0198380 | A1 * | 10/2004 | Unmehopa | 455/456.1 |

* cited by examiner

*Primary Examiner*—Rexford Barnie
(74) *Attorney, Agent, or Firm*—Duke W. Yee; Mark S. Walker; Wayne P. Bailey

(57) ABSTRACT

A method, computer program product, and data processing system for allowing a third party to assume a mobile telephone user's airtime and other charges when the mobile telephone user enters a particular geographic area, such as the third party's property is disclosed.

34 Claims, 5 Drawing Sheets

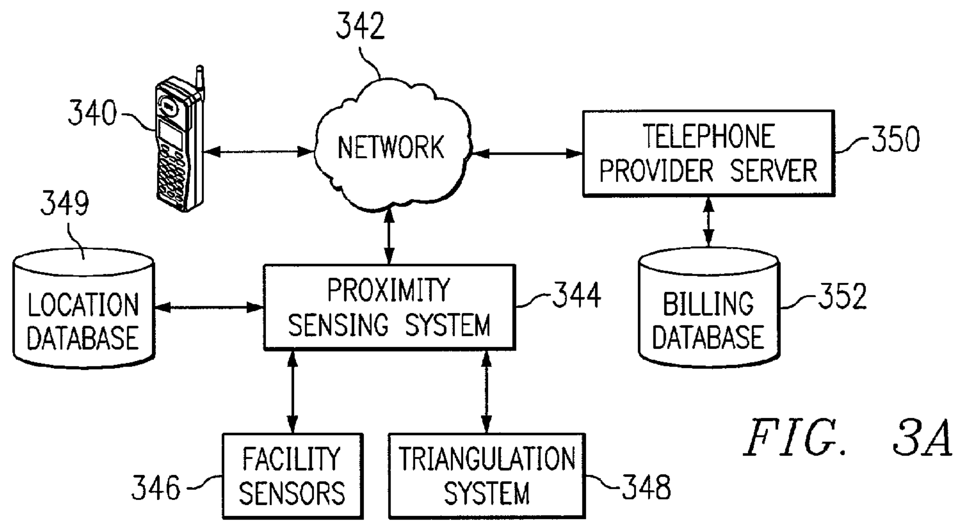
*FIG. 3A*
*FIG. 3B*
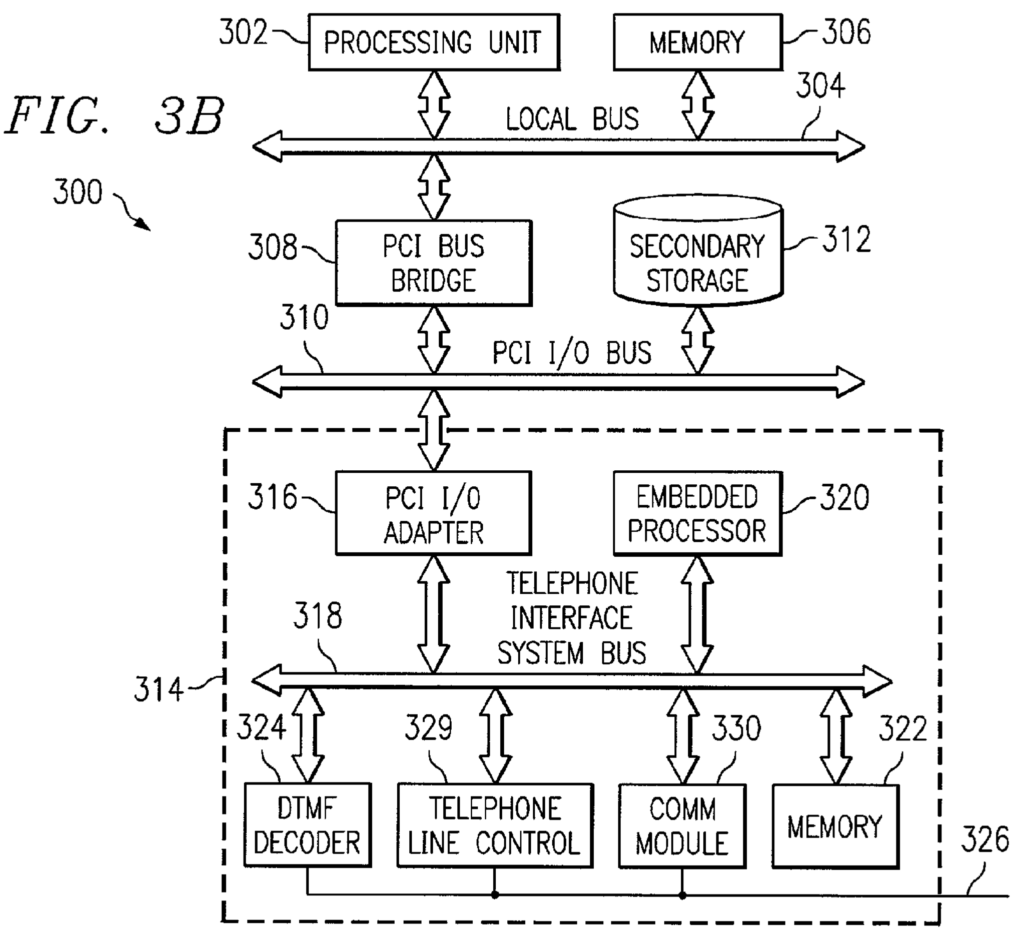

700

| INTERVENER (702) | NW COORDINATE (704) | SE COORDINATE (706) |
|---|---|---|
| SUPERDUPERMART | (1,3) | (75,80) |
| BANK OF THE UNIVERSE | (321,700) | (380,800) |
| CHEZ MICHEL | (100,150) | (150,200) |

800

| ACCOUNT HOLDER 804 | ACCOUNT NUMBER 806 | USE TIME MINUTES 808 | DATE 810 | BILLED PARTY 812 |
|---|---|---|---|---|
| MARY SMITH | 1234567 | 12 | 8/1/01 | BARNES AND NOBLE |
| JAMES HENRY | 7654321 | 7 | 8/12/01 | ACE HARDWARE |
| JOHN DOE | 5476231 | 30 | 8/27/01 | WALMART |
| SUSAN RIGHT | 1467238 | 13 | 8/8/01 | SEARS |
| BILL JONES | 1574892 | 20 | 8/22/01 | TOWER RECORDS |
| 802 JOHN MILLS | 2749853 | 11 | 8/12/01 | BROOKS BROTHERS |
| KAY SMITH | 1357986 | 17 | 8/7/01 | BEST BUY |
| ALVIN MOORE | 9753125 | 8 | 8/15/01 | COMPUSA |

PROXIMITY-BASED MOBILE TELEPHONE BILLING INTERVENTION

BACKGROUND OF THE INVENTION

1. Technical Field

The present invention is directed generally toward administering a mobile telephone service. More specifically, the present invention is directed toward allowing a change in the billed party in a mobile telephone call.

2. Description of Related Art

The mobile telephone has ushered in a new era in interpersonal communications. While the late 1990s' widespread consumer interest in the Internet made ours a wired world, technical advances and increased consumer appeal are ushering in a new "wireless world." A number of mobile telephone manufacturers and service providers cater to a growing base of mobile telephone subscribers. Unlike most local telephone service in the United States, but akin to long-distance service, mobile telephone service is usually billed in minutes of airtime. That is, the amount a customer is charged is proportional to the amount of time spent in mobile telephone calls. For instance, a five minute call will usually cost five times as much as a one minute call.

Because having every minute of every call charged for is a major discouragement to consumers wishing to use mobile telephones, mobile service providers often employ a billing system in which customers pre-pay for a certain number of minutes of airtime each month. When a customer makes a call, the minutes of airtime are subtracted from the customer's balance of minutes for the month. Any additional minutes exceeding the customer's pre-paid balance are billed for separately. In most billing schemes, the current month's minutes expire at the end of the month if not used.

Mobile telephones, by their very nature, may be used virtually anywhere, including in stores and other establishments. It would be desirable, therefore, if establishments could provide an incentive to their customers by paying for their customers' airtime and/or other telephone charges while on the premises.

SUMMARY OF THE INVENTION

The present invention provides a method, computer program product, and data processing system for allowing a third party to assume a mobile telephone user's airtime and other charges when the mobile telephone user enters a particular geographic area, such as the third party's property.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a diagram depicting a billing intervention system in accordance with a preferred embodiment of the present invention;

FIG. 3B is a block diagram of a telephone service provider data processing system in which the processes of the present invention may be executed;

DETAILED DESCRIPTION OF THE PREFERRED EMBODIMENT

Figure 1A:
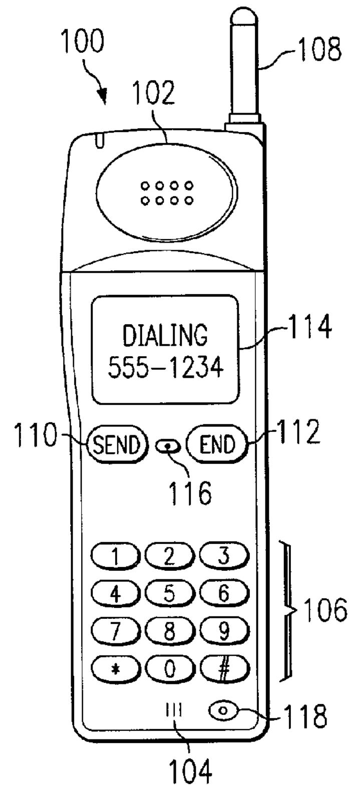
FIG. 1A is a diagram of a mobile telephone with which the processes of the present invention may be implemented.

FIG. 1 depicts an exemplary mobile telephone 100 with which the processes of the present invention can be implemented. Mobile telephone 100, for instance, could be a Talkabout® T8167 Mobile Telephone from Motorola, Inc. of Schaumberg, Ill. Like a conventional telephone, mobile telephone 100 contains an earpiece 102, a microphone 104, and a keypad 106 for emitting DTMF (Dual-Tone Multiple Frequency) tones for dialing. Mobile telephone 100, unlike a conventional telephone, uses an antenna 108 as its communications link to the Public Switched Telephone Network (PSTN), the standard public telephone network through which most telephone calls are routed. Mobile telephone 100 may transmit and receive data, including but not limited to voice data, through an analog-coded or digitally coded signal. One common communications standard for mobile telephones is the PCS (Personal Communications Services) standard, which uses digital signal coding. Some mobile telephones, such as dual-band mobile telephones, will allow multiple communications standards to be used with the same telephone; this is a convenience, particularly in remote areas where some communications protocols are not available.

Mobile telephone 100 includes a "send" button 110 and an "end" 112 button for initiating and terminating calls, respectively. To dial another telephone, a user enters the telephone number for that telephone on keypad 106 and presses "send" button 110 to place the call. To "hang up" or terminate the call, the user presses "end" button 112.

Mobile telephone 100 also includes a liquid-crystal diode (LCD) display 114 for indicating to a user the status of mobile telephone 100, such as when mobile telephone 100 is dialing. In some mobile telephones, display 114 may be used for executing software, such as games, or for browsing World Wide Web documents loaded from the Internet through a wireless connection using antenna 108.

A user of mobile telephone 100 will generally rely on a service provider to provide a wireless gateway into the PSTN. In addition to allowing a user to send and receive telephone calls, a service provider may provide additional features to customers. One of these features, as was already mentioned, is wireless Internet access. Another is voice mail. If the user of the mobile telephone 100 is unavailable (i.e., has turned off mobile telephone 100, is already talking to someone using mobile telephone 100, or simply ignores the ringing mobile telephone 100), a caller calling mobile telephone 100 can be switched into a voice mail service, where the caller can leave a message for the user of mobile telephone 100. An indicator, such as an envelope icon, can appear in display 114. The user of mobile telephone 100 can later access the voice mail service by pressing a special voice-mail button 116 or by calling a special telephone number (such as *123, for instance) or by calling the user's own number. The user can then use keypad 106 to enter DTMF tones to select recited voice mail menu options.

Figure 1B:
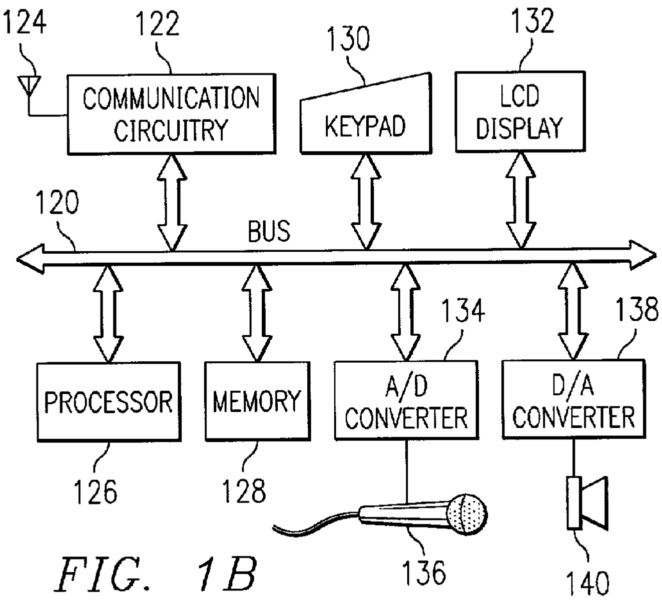
FIG. 1B is a block diagram of a mobile telephone with which the processes of the present invention may be implemented.

Mobile telephone 100 will generally run on some kind of battery power using a rechargeable battery pack, or the like. To conserve energy when mobile telephone 100 is not needed, power button 118 may be used to turn off and later turn on mobile telephone 100. When mobile telephone 100 is turned off, it cannot send or receive calls, although voice mail services are still available. FIG. 1B is a block diagram of mobile telephone 100. Bus 120 provides the central backbone through which the electronic components of mobile telephone 100 communicate.

Attached to bus 120 is a communications circuitry module 122, which transmits and receives mobile telephone signals through antenna 124 using one of a number of transmission and multiplexing schemes available for wireless communications including, but not limited to, FDMA (frequency division multiple access), TDMA (time division multiple access), CDMA (code division multiple access), and GSM (global system for mobile communications).

Communications circuitry module 122 and other components of mobile telephone 100 are controlled by processor 126 which may be a general-purpose microprocessor, such as a PowerPC microprocessor, or a digital signal processor or other specialized processor. Processor 126 executes program code stored in memory 128 to direct the operation of mobile telephone 100. Processor 126 also uses memory 128 to store data, such as frequently-dialed telephone numbers.

Figure 2:
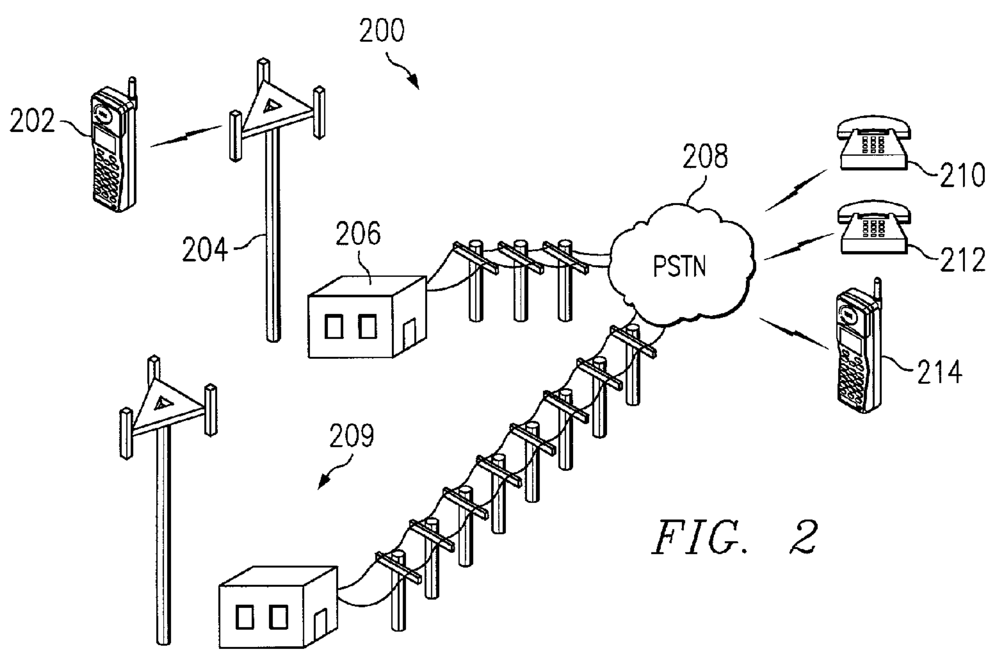
FIG. 2 is a diagram of the operation of a mobile telephone system in which the present invention may be implemented.

A variety of input-output (I/O) components communicate with processor 126 through bus 120, including keypad 130 and liquid-crystal display (LCD) 132. Analog-to-digital converter 134 takes analog audio information from microphone 136 and converts it to a digital data representation for transmission over bus 120. Likewise digital-to-analog converter 138 takes digital data from bus 120 and converts it into audio for presentation through earpiece speaker element 140. All of these I/O components communicate with and are coordinated by processor 126. For example, digital audio data created by analog-to-digital converter 134 is retrieved by processor 126, prepared for transmission by processor 126, and then sent to communications circuitry module 122 for transmission over antenna 124. To take another example, a telephone number entered by a user using keypad 130 is retrieved by processor 126, which generates DTMF tones for transmission by communications circuitry module 122. Processor 126 then displays the entered telephone number on LCD display 132 to the user. FIG. 2 is a diagram depicting the operation of a mobile telephone 202 within a telephone system 200. Mobile telephone 202 communicates with antenna tower 204, sending and receiving voice and other data, such as Internet data. Service provider facility 206 connects antenna tower 204 with Public Switched Telephone Network (PSTN) 208. Service provider facility 206 also performs such tasks as recording the number of minutes mobile telephone 202 stays connected on a call and providing voice mail and Internet services.

PSTN 208 connects service provider facility 206 with other communications devices such as telephones 210 and 212 and (by way of a service provider and antenna tower) mobile telephone 214. One of ordinary skill in the art will recognize that many communications devices that are not telephones may be connected to PSTN 208 and thus accessible by mobile telephone 202. One of ordinary skill in the art will also recognize that multiple service providers may be present within the same geographic area. In the diagram, service provider facility 209 represents an additional service provider in competition with the operators of service provider facility 206.

FIG. 3A is a diagram of a proximity-based mobile telephone billing intervention system in accordance with a preferred embodiment of the present invention. The proximity-based mobile telephone billing system in FIG. 3A changes the billed party in a mobile telephone conversation taking place in a given geographic area to a pre-determined third party. Mobile telephone 340 communicates through network 342 with other parties as depicted in FIG. 2. Network 342 comprises wireless and wired networks, including PSTN 208 of FIG. 2. Proximity sensing system 344, a data processing system also connected to network 342, provides information about the location of mobile telephone 340.

Figure 4:
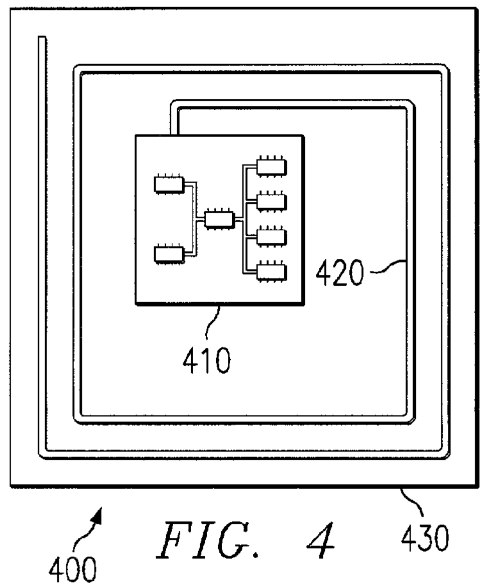
FIG. 4 is a diagram of a radio-frequency identification (RFID) tag usable in a preferred embodiment of the present invention.
Figure 5:
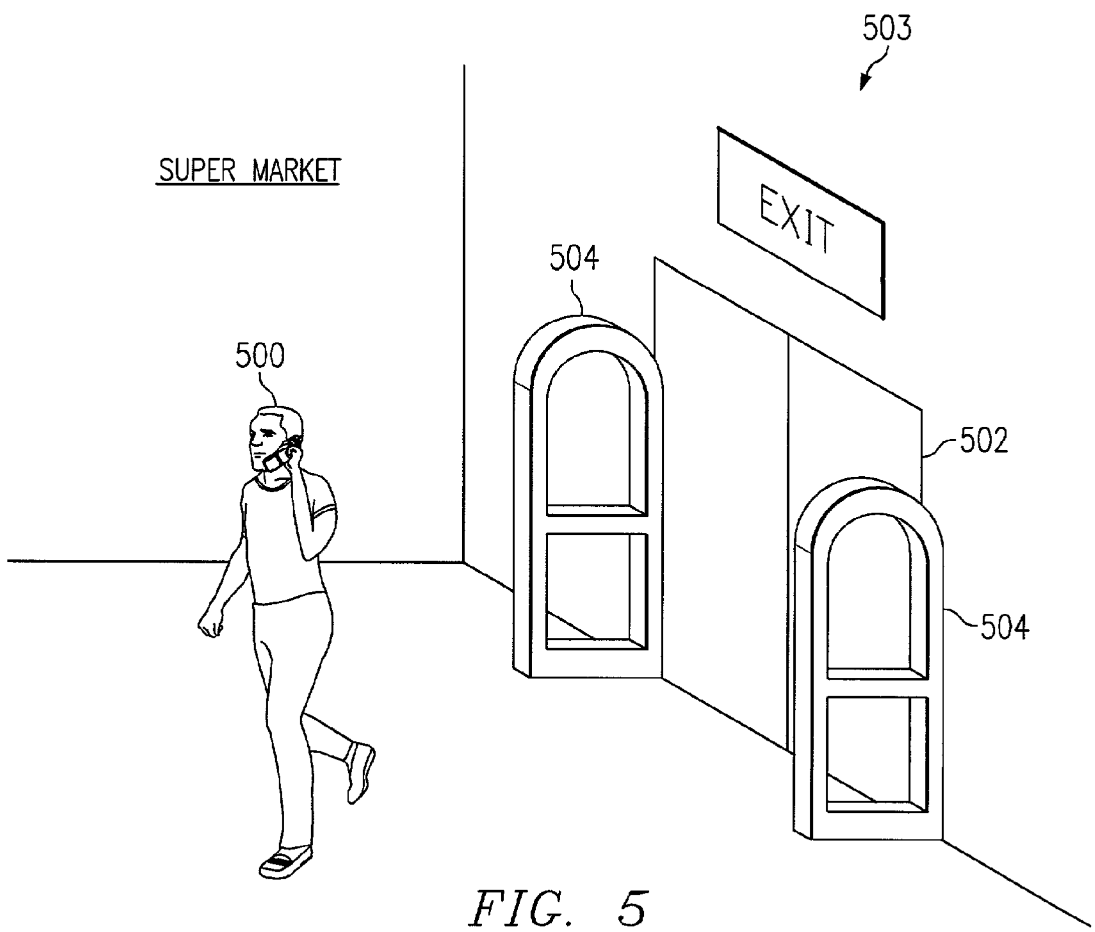
FIG. 5 is an illustration of how a radio-frequency identification tag may be used within a preferred embodiment of the present invention.

Facility sensors 346 associated with the location in which billing is to be assumed by a third-party detect the presence of mobile telephone 340 within that location. One such way to do this is depicted in FIGS. 4 and 5, which demonstrate how a Radio-Frequency Identification (RFID) tag can be affixed to mobile telephone 340 to identify it within the location in question.

Figure 6A:
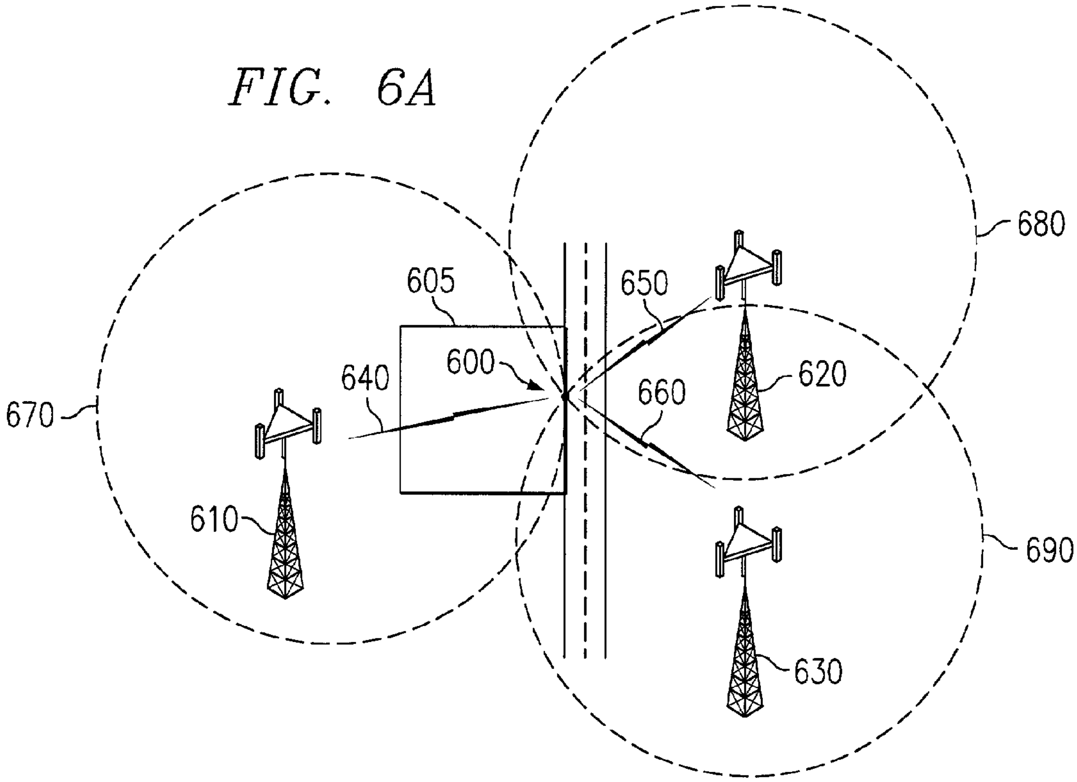
FIG. 6A is a diagram demonstrating a process of signal triangulation as a means of locating a mobile telephone in a preferred embodiment of the present invention.

Triangulation system 348 may use measurements of transmission times between mobile telephone 340 and mobile telephone antenna towers in communication with mobile telephone 340 to establish the location of mobile telephone 340 through triangulation. This process is depicted in FIG. 6A. Alternatively, triangulation system 348 may make use of the Global Positioning System (GPS), the operation of which is described in FIG. 6B. Proximity sensing system 344 may use either or both of facility sensors 346 and triangulation system 348 to establish the location of mobile telephone 340. Alternatively, any other means of determining the location of mobile telephone 340 could be used instead. Proximity sensing system 344 may make use of location database 349, which is depicted in FIG. 7, to identify locations in which billing intervention should take place. Proximity sensing system 344 notifies telephone provider server 350 that mobile telephone 340 is present within the location in question.

Telephone provider server 350, a data processing system, adjusts values in billing database 352 to charge mobile telephone airtime or other charges for mobile telephone 340 to an intervening party that has agreed to pay for mobile telephone customers' airtime in the location in question. A billing database such as 352 is described in FIG. 8.

FIG. 3B is a block diagram of a data processing system 300 in which the processes and computer program product instructions of a preferred embodiment of the present invention may be implemented. Preferably data processing system 300 will be associated with equipment operated by a mobile telephone service provider. For example, data processing system 300 may be associated or located in service provider facility 206 in FIG. 2. Data processing system 300 includes a (central) processing unit 302 connected to a local bus 304. Processing unit 302 executes instructions stored in memory 306, which is also connected to local bus 304. Processing unit 302 may comprise a single processor, such a microprocessor, or it may comprise multiple processors so as to allow the execution of multiple instructions simultaneously. Any number of processors could be used in processing unit 302. An example of a suitable processor is the PowerPC microprocessor, developed by IBM Corporation of Armonk, N.Y.

Many different types of memory are available and suitable for use within data processing system 300. Memory is generally classified as volatile and non-volatile memory. Volatile memory types store data temporarily while the data processing system is operating, but lose their data once the data processing system's power is turned off. Most volatile memory in use today is "random access memory," (RAM) meaning that data and instructions may be read from or written to any portion of the memory at any time. Common random access memory types well-known to those skilled in the art include static random access memory (SRAM) and dynamic random access memory (DRAM).

Non-volatile memory types retain their information, even when the data processing system is turned off. Non-volatile memory types are generally referred to as "read-only memories" (ROM). Many types of non-volatile memories exist. Programmable read-only memory (PROM) may be programmed with permanent data using a PROM programming device. Erasable programmable read-only memory (EPROM) can be erased of its data contents, through such means as ultraviolet radiation or through electric current (as with an electrically-erasable PROM or EEPROM). Flash memory and non-volatile random-access memory (NVRAM) are two memory media that may be written to and erased within working circuits without the use of a memory programming device.

Memory 306 may store data to be operated upon by processing unit 302, it may store instructions to be executed by processing unit 302, or it may store both. In FIG. 3B, a single memory module is depicted, although many memory arrangements are possible. Cache memory, which is a high speed memory used for temporary storage of data and instructions to be stored to read from a primary bank of memory may be used. Also, certain systems designed with what is known as a "Harvard architecture" use separate memory and buses for data and instructions.

PCI bus bridge 308 connects local bus 304 to PCI input/output (I/O) bus 310. PCI I/O bus 310 is what is known as a backplane bus. A backplane bus is not connected directly to a central processing unit, but communicates with the central processing unit via a bus bridge. Peripheral devices, such as disk drives and other input/output and storage devices typically connect to backplane buses. Having a separate backplane bus prevents peripheral device malfunctions from interrupting the operation of the central processing unit (processing unit 302).

Secondary storage 312 is connected to PCI I/O bus 310. Secondary storage 312 may comprise one or more disk drives, magnetic tape drives, optical storage devices, or other persistent storage medium. Secondary storage 312 preferably stores relatively large amounts of data and instructions compared to memory 306. Secondary storage 312 may be used for permanent storage of data or instructions, such as a database, or secondary storage 312 may be used to supplement memory 306 with additional storage space. One common method of providing additional storage space to augment memory 306, called virtual memory, involves swapping portions of data, called pages, between memory 306 and secondary storage 312 such that pages are addressed and located in memory 306 when in use, but swapped out to secondary storage 312 when not in use.

Also connected to PCI I/O bus 310 is a telephone interface device 314. Telephone interface device 314 includes a PCI I/O adapter 316 connected to PCI I/O bus 310. PCI I/O adapter 316 allows telephone interface device 314 to communicate through PCI I/O bus 310. PCI I/O adapter 316 is connected to telephone interface system bus 318, which connects the various components of telephone interface device 314. An embedded processor 320 is preferably some sort of microprocessor, such as a Z80 microprocessor, manufactured by Zilog, Inc. Embedded processor 320 executes instructions stored in memory 322, which is also attached to telephone interface system bus 318. Embedded processor 320 interprets commands communicated through PCI I/O adapter 316 and, in response, directs the operation of telephone interface device 314. Embedded processor 320 operates on data, which it stores and retrieves in memory 322. Alternatively, a microcontroller, such as an 8051 microcontroller, manufactured by Intel Corporation, could be used in place of embedded processor 320 and memory 322. A microcontroller is a monolithic integrated circuit containing both a processor unit and memory. Dual Tone Multiple Frequency (DTMF) decoder 324 interprets DTMF tones from telephone network line 326, translating the tones into corresponding numbers from a telephone keypad. DTMF decoders are available as monolithic integrated circuits from a number of vendors. DTMF decoder 324 reports the numeric interpretation of the DTMF tones to embedded processor 320 through telephone interface system bus 318.

Telephone network line 326 can be connected directly into the Public Switched Telephone Network, perhaps using a DSL (Digital Subscriber Line) modem. It may also be connected through a local-area network (LAN) using, for example, an RJ45 modular connector for an Ethernet LAN, perhaps connected to a T1line (a high-bandwidth network line). Although a standard analog telephone line may be used, a more likely option would be utilize a digital telephone line instead.

Telephone line control system 329 acts under the control of embedded processor 320 to "pick up" or "hang up" telephone network line 326. Telephone line control system 329 also detects when telephone network line 326 is "ringing."

Embedded processor 320 transmits audio messages across telephone network line 326 by transmitting digital audio data (which may include voice, indicator chimes, DTMF signals, or any other audio signal) from memory 322 through communication module 330. FIG. 4 is an example of a radio-frequency identification (RFID) tag 400 (not to scale). The tag 400 includes an integrated circuit 410 containing non-volatile memory, logic circuitry, and communications circuitry. This integrated circuit is attached to an antenna 420, which in this example is implemented as an inductor coil. All of this electronic equipment is fabricated onto a substrate, which in this example is a clear, flexible film.

This tag 400 may be written to or read from by subjecting it to a radio-frequency signal. The integrated circuit 410 reads the radio-frequency signal from the antenna 420 and interprets the signal as a command to read or write data to or from memory located on the integrated circuit.

Note that there is no power supply located on the tag 400. The integrated circuit 410 collects all of its power from the energy in the radio-frequency signal. This allows the tags to be easily and inexpensively produced and allows them to be used in a variety of environments where a device that had to supply its own power could not be used. An example of such an environment would be one in which the bulk of a power supply would be prohibitive.

RFID tags provide a ready form of identification or marking of an object. Identification information can be written to an RFID tag, where it becomes readable by any compatible reader. The kinds of information that may be stored in an RFID tag are essentially all of the same kinds of information that may be stored in a computer or other data processing system. Thus, an RFID tag identifying an item of merchandise, for instance, may include such information as the name of the product, price information, a serial number, a UPC (Universal Product Code), or any other data a merchant or manufacturer may choose to include.

FIG. 5 shows how RFID technology may be used to identify when a mobile telephone user 500 enters a particular location. Mobile telephone user 500 enters a retail establishment 503 through entrance 502. As mobile telephone user 500 enters through entrance 502, sensors 504 read mobile telephone user's account number from the contents of an RFID tag attached to mobile telephone user 500's mobile telephone. This telephone account number can then be forwarded to telephone provider server 350 (FIG. 3A) to request that the retailer be billed for mobile telephone user 500's calls, rather than mobile telephone user 500. When mobile telephone user 500 exits retail establishment 503, sensors 504 will again read the RFID tag, then notify telephone provider server 350 that the provider is to resume billing mobile telephone user 500.

FIG. 6A demonstrates the operation of an alternative embodiment of the invention utilizing the triangulation of mobile telephone signals to determine the location of the telephone user. At point 600, in building 605, a mobile telephone user holds a mobile telephone that is in communication with three mobile telephone antenna towers 610, 620, 630. The three towers 610, 620, 630 and the mobile telephone contain clocks that are synchronized with each other.

When the mobile telephone emits a signal, the three antenna towers 610, 620, 630 receive the signal at different times. This is because the distances 640, 650, 660 from the antenna towers 610, 620, 630 to point 600 are different. By calculating the time it takes for a given signal to reach an antenna station and multiplying that result by the speed of light, a known physical constant, the distances 640, 650, 660 can be obtained. Knowing the positions of the antenna stations 610, 620, 630 and knowing the distances 640, 650, 660 makes it possible to find loci of points 670, 680, 690 denoting the possible locations of the mobile telephone as determined from the point of view of each antenna tower 610, 620, 630. These loci 670, 680, 690 are simply circles with radii equal to the distances 640, 650, 660 between point 600 and the antenna stations 610, 620, 630. Where all three loci 670, 680, 690 intersect is the location of the telephone, point 600.

Figure 6B:
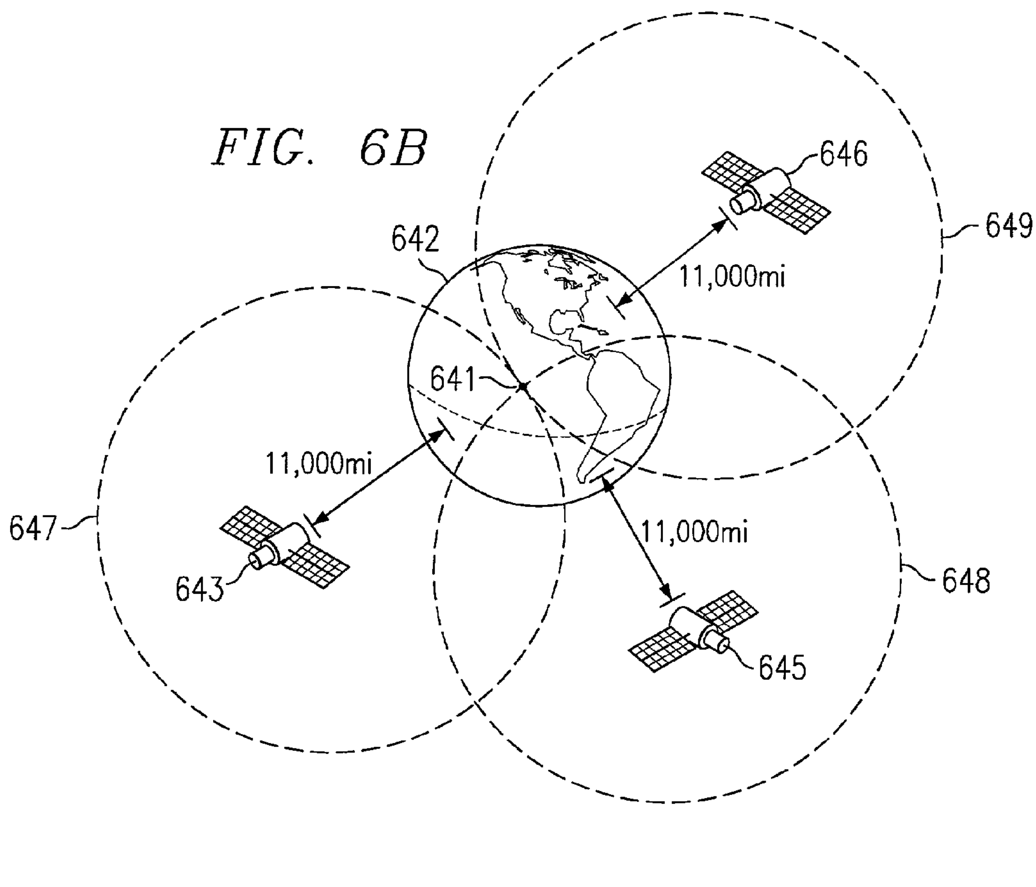
FIG. 6B is a diagram demonstrating a process of using the Global Positioning System (GPS) as a means of locating a mobile telephone in a preferred embodiment of the present invention.
Figures 7, 8, 9:
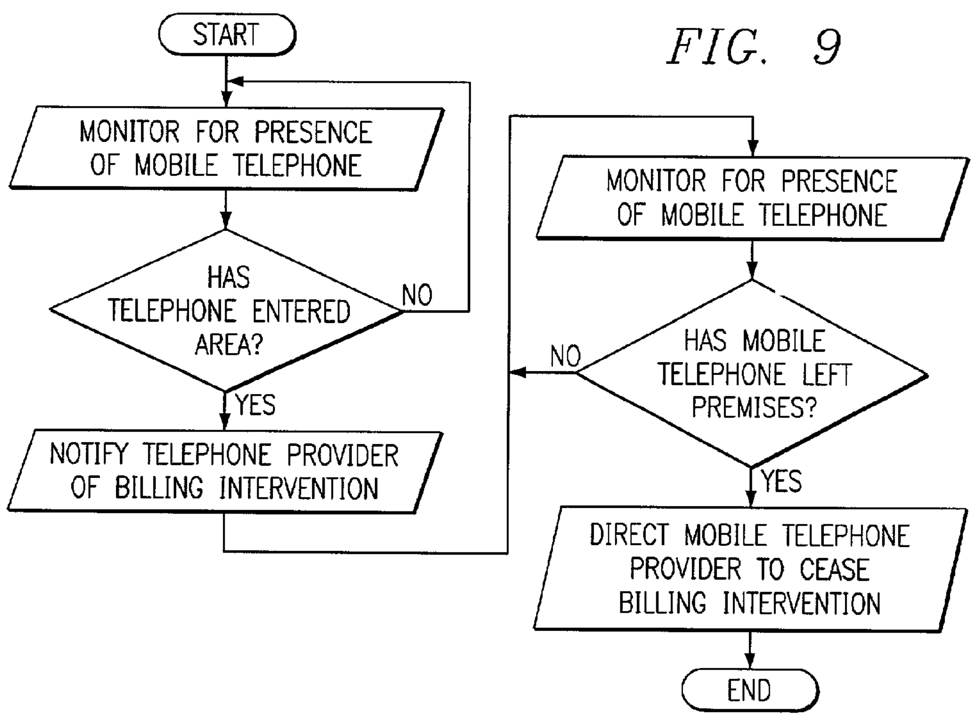
FIG. 7 is a diagram of a database storing information about various locations in which third-parties agree to pay for mobile telephone service used within the location.
FIG. 8 is a diagram of a database holding information about telephone service accounts in a preferred embodiment of the present invention.
FIG. 9 is a flowchart representation of a process of providing proximity-based mobile telephone billing intervention.

FIG. 6B depicts how the process of determining the position 641 of the mobile telephone on the earth 642 can be performed using a GPS receiver associated with the mobile telephone. GPS satellites 643, 645, 646 each contain an atomic clock and emit timing signals that are precisely synchronized. The GPS receiver at the mobile telephone's location 641 is also synchronized with the satellites 643, 645, 646. Thus, when the GPS receiver receives the signals from the satellites 643, 645, 646, it notes how long it took for the signals to reach the receiver. By determining the time it took for the signal to reach the receiver, the GPS receiver determines the distance to each of the satellites 643, 645, 646 from the receiver's location 641. Those distances are graphically represented in FIG. 6B by spheres 647, 648, 649.

An electronic almanac is stored within the GPS receiver, which allows the receiver to know the exact locations of the satellites 643, 645, 646 at any given time. Knowing the locations of three satellites 643, 645, 646, their distances from the receiver 641, and that the satellites 643, 645, 646 orbit the earth 642 at a vertical distance of 11,000 miles, allows the receiver to calculate its latitude and longitude on the earth, which is a position within the intersection of the three spheres 647, 648, 649. If four satellites are available, the altitude of the receiver can be calculated as well.

The proper party to be billed when a user enters a particular location, as determined by triangulation or other means, may be determined by making reference to a location database such as database 700 in FIG. 7. Database 700 contains fields for an intervener 702 who is to be billed for mobile telephone conversations taking place within a given area, a "northwest" coordinate 704, and a "southeast" coordinate 706. Northwest coordinate field 704 and southeast coordinate field 706 together define a rectangular geographic area for each location where charges are to be assumed by an intervener in intervener field 702. Areas with complex shapes may be represented in database 700 as a number of entries representing adjacent rectangular areas of different sizes, or alternatively through the recitation of a number of vertices defining an arbitrary polygon or any other form of geometric representation.

Database 700 and the databases in FIG. 8 may be implemented using any of a number of database infrastructures, including (but not limited to) relational and object-oriented database types. FIG. 8 is a diagram depicting the format of account information databases stored within secondary storage 312 of data processing systems according to FIG. 3B in a preferred embodiment of the present invention. Table 800 includes entries 802 for each of the customers of a mobile telephone service provider. Account holder field 804 stores the name or identity of each customer. Account number field 806 stores an account number for each customer, which may the customer's telephone number. Use time field 808 stores each customer's total use time on the premises. Date field 810 stores the dates of the use time in question. Field 812 stores the identity of the party which is assuming responsibility for paying for the use time.

Note that FIG. 8 depicts a traditional telephone billing arrangement where customers are billed for charges already accrued. The processes of the present invention are equally applicable when a customer utilizes a pre-paid billing service. In such a case, minutes are simply deducted from a balance maintained by the mobile telephone provider. Any combination of these billing schemes may be used (e.g., the mobile phone user may be a pre-paid customer, while the billed party may pay charges accrued).

FIG. 9 is a flowchart representation of a process of performing proximity-based billing intervention in a preferred embodiment of the present invention. The location in question is monitored for the presence of a mobile telephone (step 900). If a mobile telephone has entered the location (step 902), the mobile telephone provider for the mobile telephone is notified that a third-party associated with the location will be assuming the airtime charges for the call (step 904). The location continues to be monitored for the presence of the mobile telephone (step 906). If the mobile telephone has left the location (step 908), then the mobile telephone provider is directed to resume billing the mobile telephone user (step 910).

One of ordinary skill in the art will recognize that a number of variations of the present invention exist. For instance, one particularly useful feature that could be added to the embodiment herein described would be a notification to the non-billed party that the billed party has accepted all airtime charges. The notification may be as simple as a chime played in the earpiece of the non-billed party's telephone. It may be a text message or icon transmitted and displayed on display 114 (FIG. 1) along with the billed party's telephone number or sent via instant messaging for example.

Another possible variation on the present invention involves billing arrangements between customers having different telephone service providers. Service providers would enter into reciprocal agreements to allow billing overrides with different service providers. Service providers would agree to exchange rates, wherein airtime minutes from one service provider would have a relative value vis-à-vis services or features from another service provider. For example, two service providers (A and B) may agree to allow billing overrides between the two service providers with an exchange rate of 3 minutes of A for every 2 minutes of B. Accordingly, a customer of B could be billed for 100 minutes of airtime by a customer of A. The customer of B would then be billed for only 67 minutes, due to the exchange rate between A and B.

Though business establishments are the most likely candidates for employing the present invention, the invention is not limited to commercial transactions. Any establishment may employ the present invention. For example, an may use the present invention to simplify reimbursements to its employees. For example, an organization may apply the present invention to mobile phone calls made by its employees while on the premises. This eliminates the need for employees to keep track of the business related mobile phone use and then submit a reimbursement request. In this case, the billing intervention would be applied to all mobile phones which are identified as employee phones.

Another example of a non-commercial application of the present invention is college students. Universities may attract students by offering to assume the billing (or a portion of the billing) for mobile phones which are owned by registered students.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method operative with respect to a telephone conversation having at least one party operating a mobile telephone in accordance with an agreement with a service provider, the method comprising:

detecting whether the mobile telephone is present within a pre-defined geographic area; and responsive to detecting that the mobile telephone is present within the pre-defined geographic area, writing data to a billing record to indicate that a second party has been billed for mobile telephone airtime charges of the at least one party operating a mobile telephone, wherein the second party is a party (i) other than the at least one party operating a mobile telephone, (ii) other than the service provider, and (iii) other than a party calling the at least one party operating the mobile telephone.

2. The method of claim 1, further comprising:

writing data to the billing record to indicate that the second party has been billed for additional charges of the at least one party operating a mobile telephone that are other than mobile telephone airtime charges.

3. The method of claim 2, wherein the other charges include at least one of long distance charges, local toll charges, and local telephone call charges.

4. The method of claim 1, further comprising:

presenting an indication to the at least one party operating a mobile telephone that the at least one party operating a mobile telephone will not be billed for the mobile telephone airtime charges, and wherein the second party is at least one of (i) a retailer having a place of business physically located at least partially within the at the pre-defined geographic location, (ii) an employer having a place of business physically located at least partially within the predefined geogranhic location, and (iii) a school establishment having a place of business physically located at least partially within the pre-defined geographic location.

5. The method of claim 1, wherein the pre-defined geographic area is with respect to a business establishment that is physically located at least partially within the predefined geographic area, and wherein the at least one party initiates a call within the pre-defined geographic area, and the mobile telephone airtime charges are associated with the call and billed to the business establishment.

6. The method of claim 1, wherein the at least one party answers a call within the pre-defined geographic area, and the mobile telephone airtime charges are associated with the call.

7. The method of claim 1, wherein the at least one party enters the pre-defined geographic area while a call is in progress, and the mobile telephone airtime charges billed to the second party are associated with the call during a time that the at least one party is physically located within the pre-defined geographic area.

8. The method of claim 1, further comprising:

responsive to detecting that the mobile telephone has left the pre-defined geographic area, writing additional data to the billing record to indicate that the at least one party has been billed for mobile telephone airtime charges accrued after leaving the pre-defined geographic area.

9. The method of claim 1, wherein the detecting step includes triangulating the position of the mobile telephone from signal transmission times.

10. The method of claim 9, wherein the signal transmission times include at least one of mobile telephone signal transmission times and Global Positioning System (GPS) signal transmission times.

11. The method of claim 1, wherein the detecting step includes using at least one sensor located in the pre-determined area to detect the presence of the mobile telephone.

12. The method of claim 11, wherein the at least one sensor includes a radio-frequency identification tag reader.

13. A computer program product in a computer readable medium, operative with respect to a telephone conversation having at least one party operating a mobile telephone in accordance with an agreement with a service provider, comprising instructions for:

detecting whether the mobile telephone is present within a pre-defined geographic area; and responsive to detecting that the mobile telephone is present within the predefined geographic area, writing data to a billing record to indicate that a second party has been billed for mobile telephone airtime charges of the at least one party operating a mobile telephone, wherein the second party is a party (i) other than the at least one party operating a mobile telephone, (ii) other than the service provider, and (iii) other than a party calling the at least on party operating the mobile telephone.

14. The computer program product of claim 13, comprising additional instructions for:

writing data to the billing record to indicate that the second party has been billed for additional charges of the at least one party operating a mobile telephone that are other than mobile telephone airtime charges.

15. The computer program product of claim 14, wherein the additional charges include at least one of long distance charges, local toll charges, and local telephone call charges.

16. The computer program product of claim 13, comprising additional instructions for:

presenting an indication to the at least one party operating a mobile telephone that the at least one party operating a mobile telephone will not be billed for the mobile telephone airtime charges, and wherein the second party is at least one of (i) a retailer having a place of business physically located at least partially within the at the pre-defined geographic location, (ii) an employer having a place of business physically located at least partially within the predefined geographic location, and (iii) a school establishment having a place of business physically located at least partially within the pre-defined geographic location.

17. The computer program product of claim 13, wherein the pre-defined geographic area is with respect to a business establishment that is physically located at least partially within the predefined geographic area, and wherein the at least one party initiates a call within the pre-defined geographic area, and the mobile telephone airtime charges are associated with the call.

18. The computer program product of claim 13, wherein the at least one party answers a call within the pre-defined geographic area, and the mobile telephone airtime charges are associated with the call.

19. The computer program product of claim 13, wherein the at least one party enters the pre-defined geographic area while a call is in progress, and the mobile telephone airtime charges billed to the second party are associated with the call during a time that the at least one party is physically located within the pre-defined geographic area.

20. The computer program product of claim 13, comprising additional instructions for:

responsive to detecting that the mobile telephone has left the pre-defined geographic area, writing additional data to the billing record to indicate that the at least one party has been billed for mobile telephone airtime charges accrued after leaving the pre-defined geographic area.

21. The computer program product of claim 13, wherein the detecting step includes triangulating the position of the mobile telephone from signal transmission times.

22. The computer program product of claim 21, wherein the signal transmission times include at least one of mobile telephone signal transmission times and Global Positioning System (GPS) signal transmission times.

23. The computer program product of claim 13, wherein the instructions for detecting include instructions for using at least one sensor located in the pre-determined area to detect the presence of the mobile telephone.

24. The computer program product of claim 23, wherein the at least one sensor includes a radio-frequency identification tag reader.

25. A data processing system operative wit respect to a telephone conversation having at least one party operating a mobile telephone in accordance with an agreement with a service provider, comprising:

a bus system;

a processing unit including at least one processor; and a memory containing a set of instructions, wherein the processing unit executes the set of instructions to perform the acts of:

detecting whether the mobile telephone is present within a pre-defined geographic area; and responsive to detecting that the mobile telephone is present within the pre-defined geographic area, writing data to a billing record to indicate that a second party has been billed for mobile telephone airtime charges of the at least one party operating a mobile telephone, wherein the second party is a party (i) other than the at least one party operating a mobile telephone, (ii) other than the service provider, and (iii) other than a party calling the at least one party operating the mobile telephone.

26. The data processing system of claim 25, wherein the processing unit executes the set of instructions to perform the additional acts of:

writing data to the billing record to indicate that the second party has been billed for additional charges of the at least one party operating a mobile telephone that are other than mobile telephone airtime charges.

27. The data processing system of claim 26, wherein the additional charges include at least one of long distance charges, local toll charges, and local telephone call charges.

28. The data processing system of claim 25, wherein the processing unit executes the set of instructions to perform the additional acts of:

presenting an indication to the at least one party operating a mobile telephone that the at least one party operating a mobile telephone will not be billed for the mobile telephone airtime charges, and wherein the second party is at least one of (i) a retailer having a place of business physically located at least partially within the at the pre-defined geographic location, (ii) an employer having a place of business physically located at least partially within the predefined geographic location, and (iii) a school establishment having a place of business physically located at least partially within the pre-defined geographic location.

29. The data processing system of claim 25, wherein the pre-defined geographic area is with respect to a business establishment that is physically located at least partially within the predefined geographic area, and wherein the at least one party initiates a call within the pre-defined geographic area, and the mobile telephone airtime charges are associated with the call.

30. The data processing system of claim 25, wherein the at least one party answers a call within the pre-defined geographic area, and the mobile telephone airtime charges are associated with the call.

31. The data processing system of claim 25, wherein the at least one party enters the pre-defined geographic area while a call is in progress, and the mobile telephone airtime charges billed to the second party are associated with the call during a time that the at least one party is physically located within the pre-defined geographic area.

32. The data processing system of claim 25, wherein the processing unit executes the set of instructions to perform the additional acts of:

responsive to detecting that the mobile telephone has left the pre-defined geographic area, writing additional data to the billing record to indicate that the at least one party has been billed for mobile telephone airtime charges accrued after leaving the pre-defined geographic area.

33. The data processing system of claim 25, wherein the detecting step includes triangulating the position of the mobile telephone from signal transmission times.

34. The method of claim 33, wherein the signal transmission times include at least one of mobile telephone signal transmission times and Global Positioning System (GPS) signal transmission times.

* * * * *

UNITED STATES PATENT AND TRADEMARK OFFICE

CERTIFICATE OF CORRECTION

PATENT NO. : 6,993,319 B2
APPLICATION NO. : 09/942797
DATED : January 31, 2006
INVENTOR(S) : Himmel et al.

It is certified that error appears in the above-identified patent and that said Letters Patent is hereby corrected as shown below:

Col. 10, line 40: before "pre-defined" delete "at the".

Col. 10, line 42: after "predefined" delete "gregranhic" and insert --geographic--.

Col. 11, line 31: after "least" delete "on" and insert --one--.

Col. 11, line 50: before "pre-defined" delete "at the".

Col. 12, line 29: after "operative" delete "wit" and insert --with--.

Col. 13, line 2: before "pre-defined" delete "at the".

Col. 14, line 16: after "34. The" delete "method" and insert --data processing system--.

Col. 14, after line 19, insert a return and the following:
--35. The data processing system of claim 25, wherein the detecting act includes using at least one sensor located in the pre-determined area to detect the presence of the mobile telephone.
36. The data processing system of claim 35, wherein the at least one sensor includes a radio-frequency identification tag reader.--

Signed and Sealed this

Eighteenth Day of September, 2007

JON W. DUDAS
*Director of the United States Patent and Trademark Office*

Disclaimer

6,993,319 — Maria Azua Himmel, Yorktown Heights, NY (US); Herman Rodriguez, Austin, TX (US); Newton James Smith, Jr., Austin, TX (US); and Clifford Jay Spinac, Austin, TX (US). PROXIMITY-BASED MOBILE TELEPHONE BILLING INTERVENTION. Patent dated January 31, 2006. Disclaimer filed October 06, 2006, by the assignee, International Business Machines Corporation.

Hereby completely disclaims all of the claims of said patent.

*(Official Gazette November 25, 2008)*